(12) United States Patent
Gunnels

(10) Patent No.: US 9,676,370 B2
(45) Date of Patent: Jun. 13, 2017

(54) WASHER FLUID DELIVERY SYSTEM

(71) Applicant: Continental Automotive Systems, Inc., Auburn Hills, MI (US)

(72) Inventor: Daniel Jerome Gunnels, Goodrich, MI (US)

(73) Assignee: Continental Automotive Systems, Inc., Auburn Hills, MI (US)

( * ) Notice: Subject to any disclaimer, the term of this patent is extended or adjusted under 35 U.S.C. 154(b) by 0 days.

(21) Appl. No.: 14/843,184

(22) Filed: Sep. 2, 2015

(65) Prior Publication Data

US 2016/0068139 A1     Mar. 10, 2016

Related U.S. Application Data

(63) Continuation of application No. 62/046,273, filed on Sep. 5, 2014.

(51) Int. Cl.
*B60S 1/50* (2006.01)
*B67D 3/00* (2006.01)
*B60S 1/48* (2006.01)

(52) U.S. Cl.
CPC ........... *B60S 1/50* (2013.01); *B60S 1/482* (2013.01); *B67D 3/0035* (2013.01)

(58) Field of Classification Search
CPC .... B60S 1/50; B60S 1/482; B60S 1/48; B60S 1/481; B60S 1/488; B67D 3/0032; B67D 3/0035; B67D 3/0029; B67D 3/008; B67D 3/0083; B67D 3/0087; B67D 3/009; B67D 1/0009; B67D 2001/0814; B67D 3/0038

USPC ........... 239/284.1, 284.2, 209, 302, 272, 239/375–379; 141/363, 284, 113, 319; 222/88, 325, 181.1, 541.1, 81, 83.5; 215/247, 254; 220/229; 221/154
See application file for complete search history.

(56) References Cited

U.S. PATENT DOCUMENTS

| | | | |
|---|---|---|---|
| 4,905,904 A * | 3/1990 | Ohara | B67B 7/28 215/309 |
| 8,037,908 B1 * | 10/2011 | Green | B67D 3/0035 141/18 |
| 2005/0274735 A1 * | 12/2005 | Patel | B67D 3/0029 222/83.5 |
| 2009/0057258 A1 * | 3/2009 | Tornqvist | A61J 1/20 215/247 |
| 2010/0140378 A1 * | 6/2010 | Pilette | B60S 1/50 239/309 |

* cited by examiner

*Primary Examiner* — Arthur O Hall
*Assistant Examiner* — Juan C Barrera

(57) ABSTRACT

A washer fluid a vehicle comprises a motor and pump assembly and a holster assembly configured to receive a washer bottle. The holster assembly includes a cage configured to receive a washer bottle, a handle to secure the washer bottle within the holster assembly, a locking device to secure a handle of the washer bottle in place, and a bayonet to pierce a foil cap of the washer bottle when the washer bottle is received within the cage portion of the holster assembly. Once the washer bottle is secured within the holster assembly the motor and pump assembly are in fluid communication with the bottle.

11 Claims, 2 Drawing Sheets

WASHER FLUID DELIVERY SYSTEM

CROSS REFERENCE TO RELATED APPLICATION

This application claims priority to U.S. Provisional Application No. 62/046,273 filed on Sep. 5, 2014.

TECHNICAL FIELD

The present disclosure relates to automotive vehicles and more particularly to washer systems for automotive vehicles.

BACKGROUND

During use automotive vehicles collect dust and debris that may obscure the operator's point of view. In colder climates ice may also form on these surfaces. Automotive vehicles are typically equipped with windshield washer systems and the heating system typically includes defrosting options. Recently, the washing and heating systems have been expanded to also provide fluid and/or defrosting to other locations on the vehicle such as rear windows and headlamps. Automotive vehicles are now including externally mounted cameras for driver assistance systems, such as back up assist and parking assist. These cameras frequently become obscured as a result of dirt and debris. Therefore, vehicle washing systems are sometimes used to clean the camera surface.

Due to the increased demand for use of the washer systems vehicles use washer fluid more quickly. Design of washer fluid reservoirs must also meet vehicle packaging, reliability and durability standards.

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

SUMMARY

A washer fluid a vehicle comprises a motor and pump assembly and a holster assembly configured to receive a washer bottle. The holster assembly includes a cage configured to receive a washer bottle, a handle to secure the washer bottle within the holster assembly, a locking device to secure a handle of the washer bottle in place, and a bayonet to pierce a foil cap of the washer bottle when the washer bottle is received within the cage portion of the holster assembly. Once the washer bottle is secured within the holster assembly the motor and pump assembly are in fluid communication with the bottle.

A method of applying washer fluid to a vehicle comprises placing a washer bottle within a cage for a holster assembly configured to receive a washer bottle and piercing a foil cap of the washer bottle with a bayonet when the washer bottle is received within the cage portion of the holster assembly. The washer bottle is rotated relative to the holster assembly to create a seal between the washer bottle and a fluid inlet and then a handle of the holster assembly is moved to secure the washer bottle within the holster assembly. A locking device is also used to secure a handle of the washer bottle in place and prevent rotation. Once the washer bottle is secured within the holster assembly the motor and pump assembly are in fluid communication with the bottle.

Further areas of applicability of the present disclosure will become apparent from the detailed description provided hereinafter. It should be understood that the detailed description and specific examples, while indicating the preferred embodiment of the disclosure, are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

DETAILED DESCRIPTION

Figure 1:
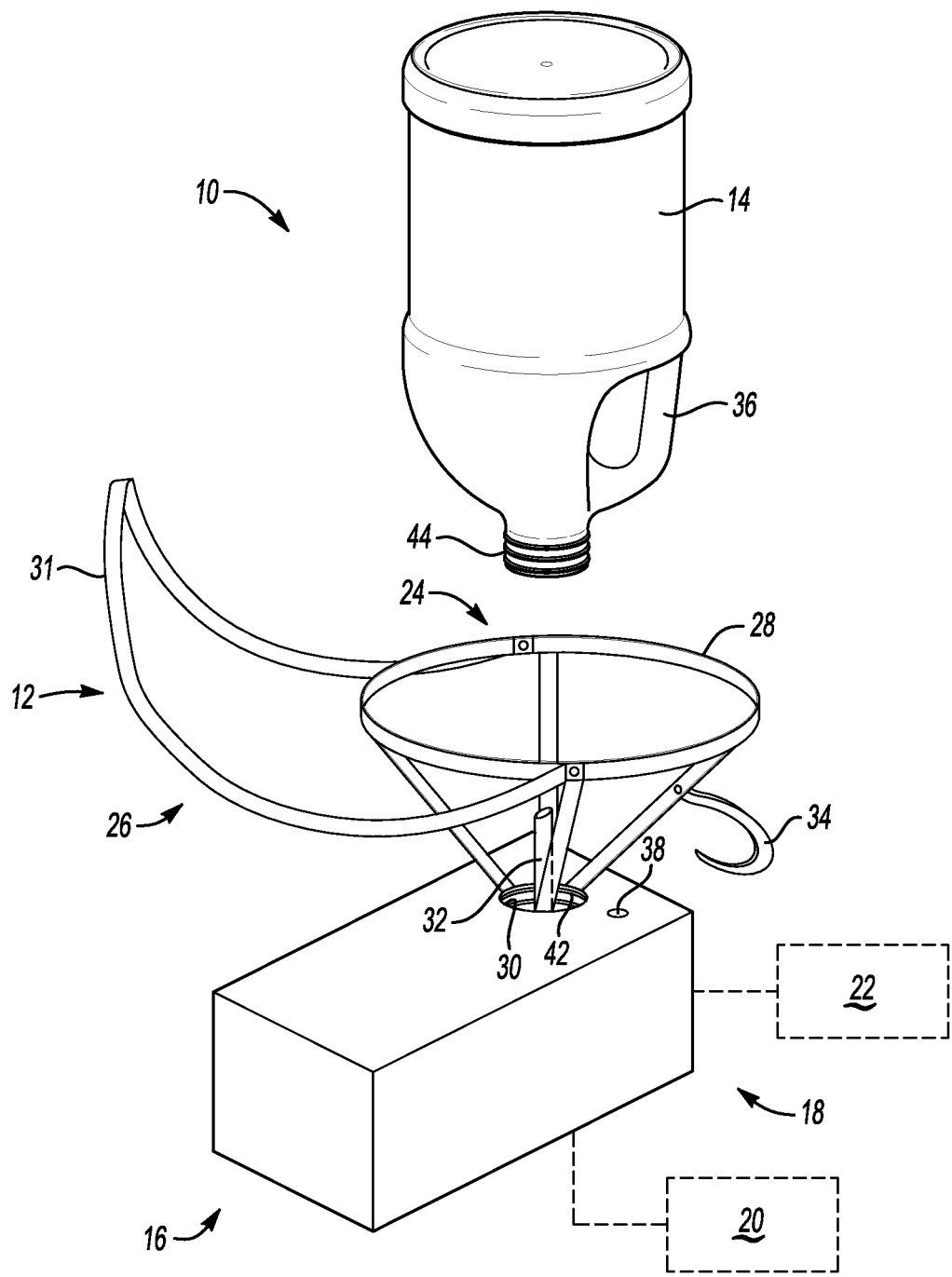
FIG. 1 is a schematic illustration of a washer delivery system of the present invention for a vehicle.

The following description is merely exemplary in nature and is in no way intended to limit the disclosure, its application, or uses. For purposes of clarity, the same reference numbers will be used in the drawings to identify similar elements. FIG. 1 illustrates a vehicle 10 having a washer fluid system 12. The washing system 12 includes a fluid reservoir 14, a motor 16 and a pump 18. Fluid lines connect the motor 16 and pump 18 to washer nozzles 20 for dispensing the fluid at the desired locations. A control 22 for the washing system 12 may be mounted in the passenger compartment of the vehicle 10.

As illustrated in FIG. 1 the fluid reservoir 14 is a washer bottle. The washer bottle 14 may be washer fluid in a standard bottle that can be purchased from a store. Rather than using the fluid to refill a reservoir that is in the vehicle, the washer bottle 14 itself can be placed and secured in the vehicle 10 to act as the fluid reservoir. Once the washer bottle 14 is empty it can be replaced with a new bottle.

The washer bottle 14 may be held in a specially designed bracket 24 and holster assembly 26 made from molded plastic. The bracket 24 secures the holster assembly 26 within the vehicle 10, e.g. to the vehicle frame. The bracket 24 may be any type of mechanical design that will provide a secure connection between the holster assembly and vehicle 10. They shape, size, and type of bracket 24 may vary depending on the design of the holster assembly 26 and the mounting location within the vehicle 10.

The holster assembly 26 may include a cage portion 28 which is configured to match the shape of a typical washer bottle 14. The cage 28 may receive and guide the washer bottled toward a fluid inlet 30 to the washer motor 16 and pump 18 assembly. As shown in FIG. 1, the motor 16 and pump 18 assembly can be located in a single housing. Alternatively, as shown in FIG. 2, the motor 16 and pump 18 may be separate housings secured to one another.

The holster assembly 28 would also include a handle portion 31 which may hinge open and have design features to ensure foolproof alignment of the washer fluid bottle 14 to slide into the engagement point and/or fluid inlet 30. The holster assembly 28 may also include a bayonet 32 to pierce a foil cap on the washer bottle 14.

Figure 2:
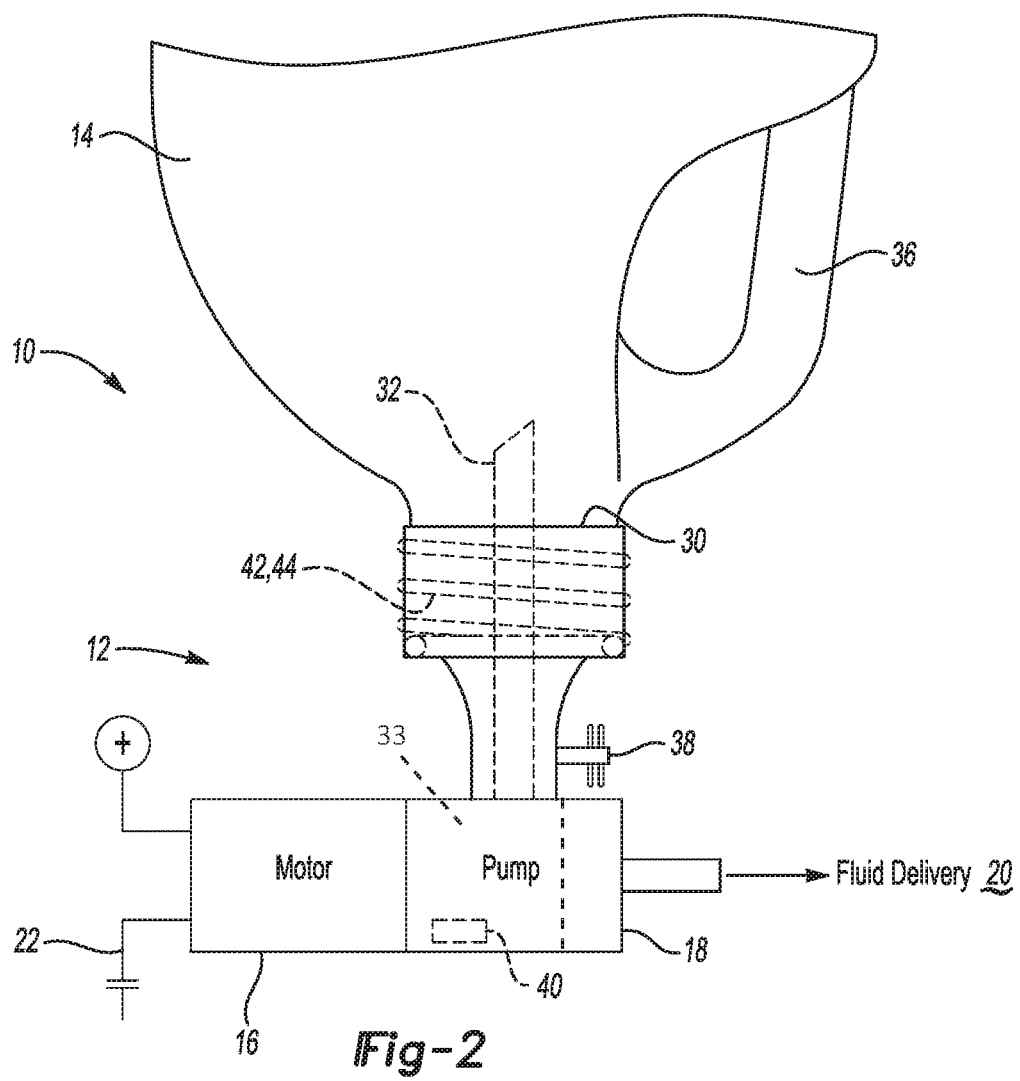
FIG. 2 is an enlarged view of the fluid reservoir retaining arrangement for the washer delivery system of the FIG. 1.

Then the consumer would rotate (screw) the washer bottle 14, e.g. clockwise 270 degrees, to make a seal between the fluid inlet 30 and the washer bottle 14, as shown in FIG. 2 with in internal threaded engagement at the fluid inlet 30. A locking device 34 would use the handle 36 of the bottle 14 to secure the washer bottle 14 into place. An air vent 38 in the pump 18 or on the holster assembly 28 may allow air flow in to the washer bottle 14 as the washer fluid exits the bottle 14 and enters the pump 18.

The washer fluid system 12 could be entirely or partially packaged in the engine compartment or trunk of the vehicle 10. Alternatively, separate washer systems 12 could be located in the vicinity of the engine compartment and/or trunk of the vehicle 10, depending on the demands of the vehicle 10 on the washer system 12.

The washer system 12 may include a low fluid sensor 40. The low fluid sensor 40 may be a weight sensor between the washer bottle 14 and the holster assembly 28, a pressure sensor, e.g. in the pump 18, or may be a float sensor within the pump 18. Additionally, a small fluid chamber 33 may be located in the pump 18, to accommodate the float style sensor and/or to allow enough fluid for the washer fluid system to operate several times prior to running out of fluid once the sensor 40 indicates low fluid level. In this manner, the washer system 12 may provide warning for the user to replace the washer bottle 14 before the system 12 is out of fluid, but after the washer bottle 14 is empty and can be replaced easily. In one embodiment the fluid chamber 33 is a pump intake chamber.

FIG. 2, illustrates and enlarged view of the fluid inlet 30. As shown the bayonet 32 may be pointed to provide a sharp edge for piercing the foil on the purchased and new washer bottle 14. The bayonet 32 may be hollow to allow for fluid delivery through the bayonet 32 to the motor 16 and pump 18. Alternatively, once the foil is pierced by the bayonet 32 the subsequent opening will tear further as a result of fluid pressure from within the washer bottle 14 and the movement and vibrations of the operating vehicle 10. Thus, fluid will also flow around the bayonet 32.

The housing 15 which defines the fluid inlet 30 may be internally threaded, shown at 42, such that when the washer bottle 14 is rotated relative to the housing 15 it is pulled into a sealed engagement with the housing 15. The internal threading 42 can match eternal threads 44 on the washer bottle 14. The external threads 44 are also to secure a cap (not shown) on the washer bottle 14 during prior storage, transportation and retail of the washer bottle 14.

While the best modes for carrying out the invention have been described in detail the true scope of the disclosure should not be so limited, since those familiar with the art to which this invention relates will recognize various alternative designs and embodiments for practicing the invention within the scope of the appended claims.

What is claimed is:

1. A washer fluid system for a vehicle comprising: a motor and pump assembly having a housing which defines a fluid inlet for receiving fluid for the washer system; an internally threaded section of the housing at the fluid inlet, wherein the threaded section corresponds to typical external threads on a washer bottle; a holster assembly configured to receive said washer bottle, wherein the holster assembly includes; a cage configured to receive a portion of the washer bottle; a handle to secure the washer bottle within the holster assembly; a locking device to secure a handle of the washer bottle once the washer bottled is placed and rotated to engage the threads located on the housing at the fluid inlet, wherein the bottle is rotated to an assembled position, wherein the locking device prevents rotation of the washer bottle on the threads and relative to the housing defining the fluid inlet; and a bayonet to pierce a foil cap of the washer bottle when the washer bottle is received within the cage portion of the holster assembly; and wherein the motor and pump assembly are in fluid communication with the washer bottle, once the washer bottle is secured within the holster assembly.

2. The washer system of claim 1, further comprising a fluid chamber within the motor and pump assembly and a fluid level sensor located within the fluid chamber.

3. The washer system of claim 2, wherein the fluid inlet directly opens to the fluid chamber.

4. The washer system of claim 3, wherein the fluid chamber is a pump intake chamber.

5. The washer system of claim 2, wherein the fluid inlet is remotely located from and fluidly connected to the fluid chamber.

6. The washer system of claim 1, wherein a seal is formed between the washer bottle and the housing defining the fluid inlet once the washer bottle has been rotated into the assembled position.

7. The washer system of claim 1, wherein the cage portion matches the shape of a typical washer bottle to guide the washer bottle toward the fluid inlet.

8. A method of applying washer fluid to a vehicle comprising: placing a washer bottle within a cage for a holster assembly configured to receive the washer bottle; piercing a foil cap of the washer bottle with a bayonet when the washer bottle is received within the cage portion of the holster assembly; rotating the washer bottle relative to the holster assembly such that external threads on the washer bottle engage an internally threaded section of the housing at a fluid inlet; tightening the washer bottle on the internally threaded section to secure a seal between the washer bottle and said fluid inlet; moving a handle of the holster assembly to secure the washer bottle within the holster assembly; securing a locking device to secure a handle of the washer bottle in place to prevent rotation of the washer bottle on the internally threaded section and relative to the housing; and wherein a motor and pump assembly are in fluid communication with the washer bottle, once the washer bottle is secured within the holster assembly.

9. The method of claim 8, sensing a fluid level within the washer bottle with a fluid level sensor located within a fluid chamber defined by the motor and pump assembly.

10. The method of claim 9, wherein the fluid chamber is a pump intake chamber.

11. The method of claim 8, further comprising guiding the washer bottle toward the fluid inlet with the cage portion which matches the shape of a typical washer bottle.

\* \* \* \* \*